(12) United States Patent
Kuo

(10) Patent No.: US 7,495,356 B2
(45) Date of Patent: Feb. 24, 2009

(54) DUAL POWER SUPPLY SYSTEM

(75) Inventor: Heng-Chen Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/853,832

(22) Filed: Sep. 12, 2007

(65) Prior Publication Data

US 2008/0174181 A1    Jul. 24, 2008

(30) Foreign Application Priority Data

Jan. 22, 2007    (CN) .......................... 2007 1 0200089

(51) Int. Cl.
*H02J 9/00* (2006.01)
(52) U.S. Cl. ........................................................ 307/64
(58) Field of Classification Search .................. 307/43, 307/52, 64, 80, 85, 86
See application file for complete search history.

(56) References Cited

U.S. PATENT DOCUMENTS

| 3,662,182 A * | 5/1972 | Ullmann et al. ................ 307/64 |
| 5,635,772 A * | 6/1997 | Lagree et al. .................. 307/64 |
| 5,644,175 A * | 7/1997 | Galm ........................... 307/131 |
| 5,739,594 A * | 4/1998 | Sheppard et al. ............... 307/64 |
| 6,051,893 A * | 4/2000 | Yamamoto et al. .............. 307/43 |
| 6,330,176 B1 * | 12/2001 | Thrap et al. .................. 363/142 |
| 6,630,752 B2 * | 10/2003 | Fleming et al. ................. 307/64 |
| 6,653,751 B1 * | 11/2003 | Teh Lo ........................ 307/125 |
| RE38,625 E * | 10/2004 | Galm ........................... 307/130 |

* cited by examiner

*Primary Examiner*—Michael J Sherry
*Assistant Examiner*—Adi Amrany
(74) *Attorney, Agent, or Firm*—Frank R. Niranjan

(57) ABSTRACT

An exemplary dual power supply system includes a first sensor connected to a first power supply, a second sensor connected to a second power supply, a selection switch, a control circuit, and a relay switch. Each of the output terminals of the first sensor, the second sensor, and the selection switch are connected to a corresponding input terminal of the control circuit. The first and the second power supplies are connected to an electronic device via the relay switch. A control terminal of the relay switch is coupled to an output terminal of the control circuit for selectively coupling the first or the second power supply to the electronic device according to a control signal generated by the control circuit.

9 Claims, 2 Drawing Sheets

DUAL POWER SUPPLY SYSTEM

BACKGROUND

1. Field of the Invention

The present invention relates to redundant power supplies, and particularly to a dual power supply system.

2. Description of Related Art

Modern companies are relying more and more on their computer networks for their day to day operations. It is therefore, essential for the computer networks to be operational all of the time. A power failure can quickly bring down a computer network since all the network hubs and gateway require power to function. To ensure reliable network operation, most companies use uninterruptible power supplies (UPS) to protect their computer network equipment from failing during a power failure.

UPS is a device that provides battery backup when the electrical power fails or drops to an unacceptable voltage level.

SUMMARY

An exemplary dual power supply system includes a first sensor having a detecting terminal connected to a first power supply and an output terminal to send a first power signal; a second sensor having a detecting terminal connected to a second power supply and an output terminal to send a second power signal; a selection switch having an output terminal to send a selection signal; a control circuit having three input terminals connected to the output terminals of the first sensor, the second sensor, and the selection switch respectively, and an output terminal to send a control signal; and a relay switch having two throws connected to the first and second power supplies respectively, a pole connected to an electronic device, and a control terminal connected to the output terminal of the control circuit for selectively coupling the first or second power supply to the electronic device according to the control signal.

Other advantages and novel features will become more apparent from the following detailed description when taken in conjunction with the accompanying drawings, in which:

DETAILED DESCRIPTION

Figure 1:
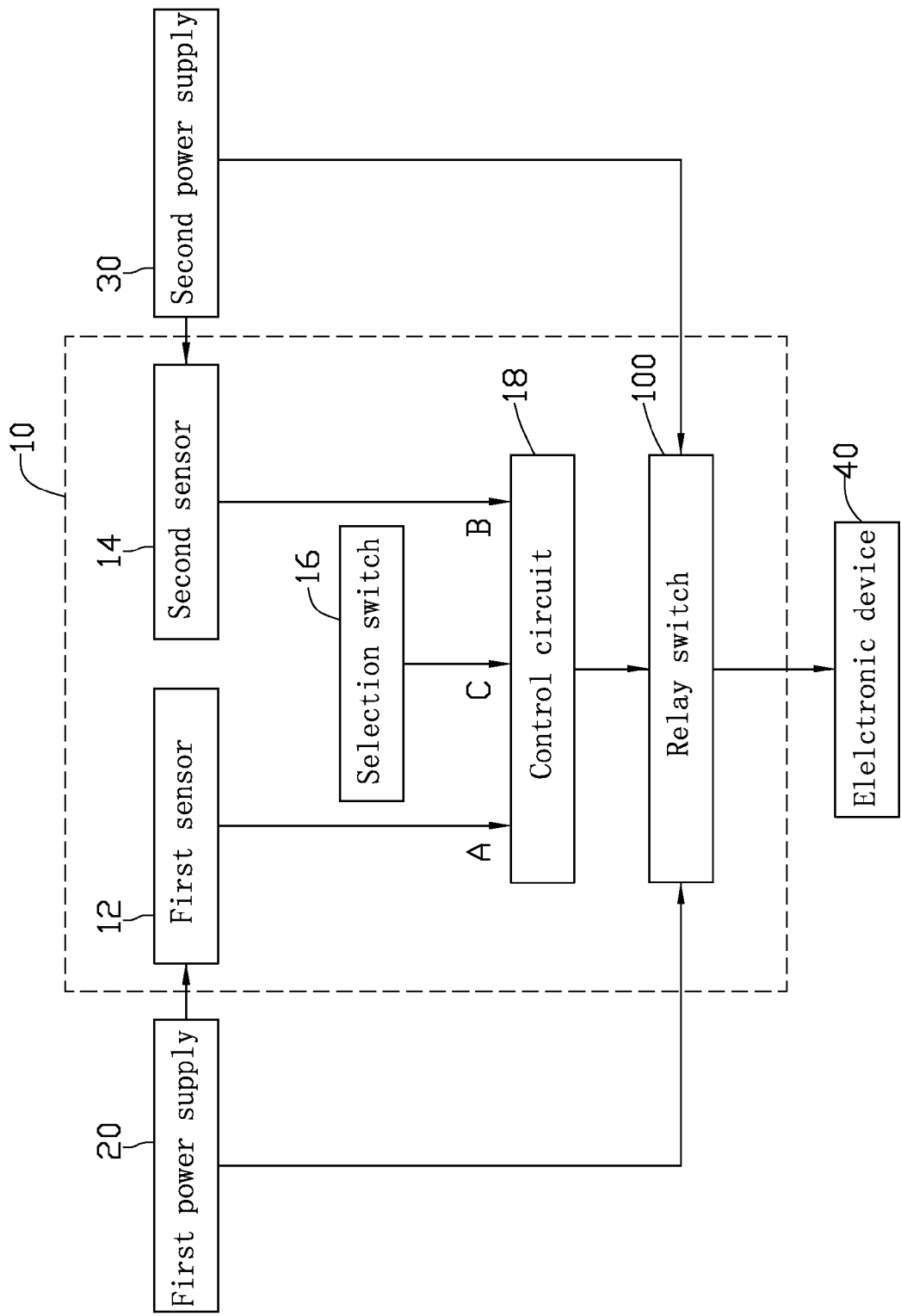
FIG. 1 is a block diagram of one embodiment of a dual power supply system in accordance with the present invention.
Figure 2:
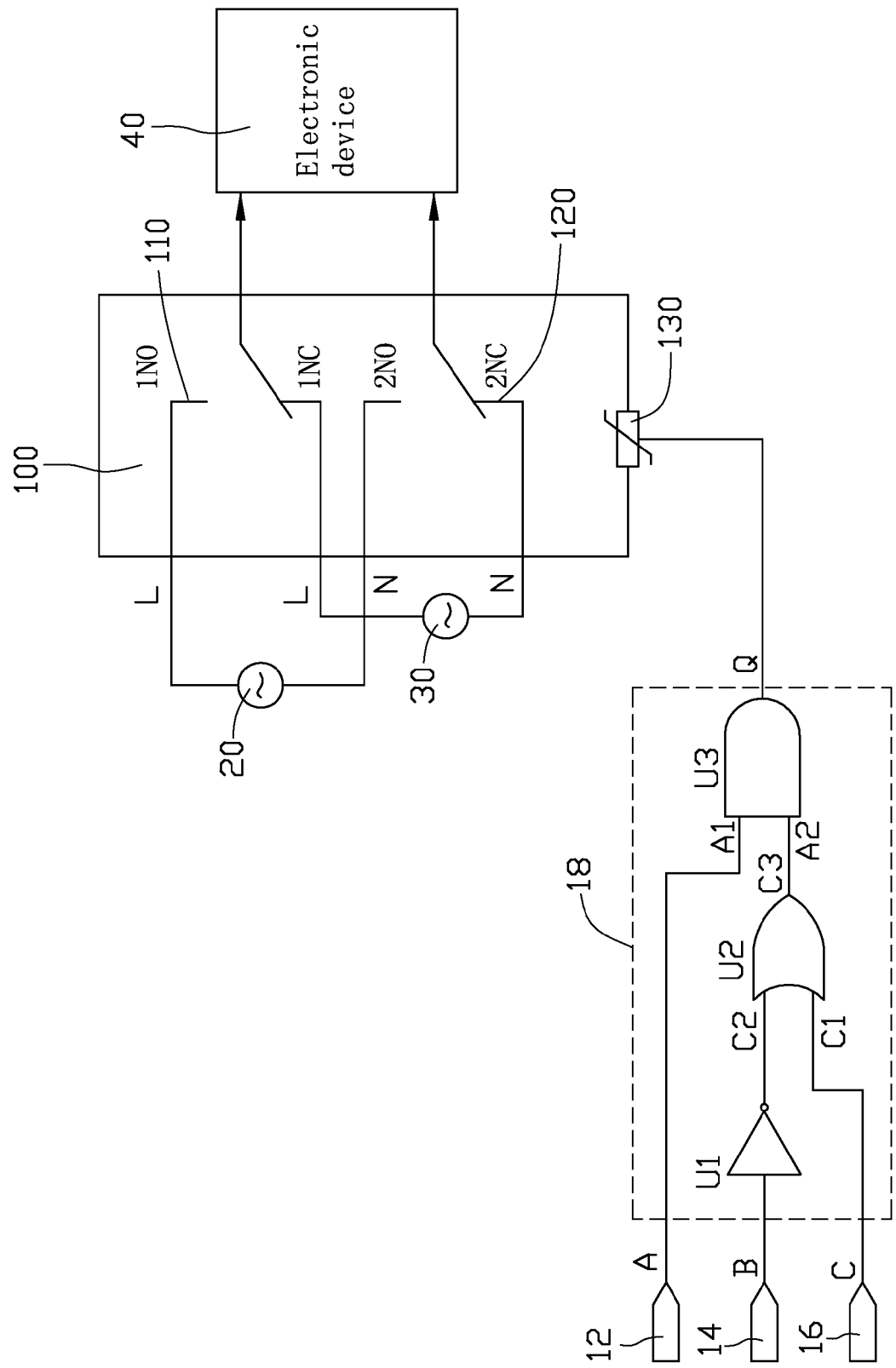
FIG. 2 is a circuit diagram of FIG. 1.

Referring to the FIG. 1 and FIG. 2, a dual power supply system in accordance with an embodiment of the present invention includes a first sensor 12, a second sensor 14, a selection switch 16, a control circuit 18, and a relay switch 100. The first sensor 12 is a voltage sensor having a detecting terminal connected to a first power supply 20 and an output terminal A to send a first power signal. The second sensor 14 is a voltage sensor having a detecting terminal connected to a second power supply 30 and an output terminal B to send a second power signal. The selection switch 16 has an output terminal C to send a selection signal. The control circuit 18 has three input terminals connected to the output terminals A~C of the first sensor 12, the second sensor 14, and the selection switch 16 respectively, and an output terminal to send a control signal.

In this embodiment, when the first power supply 20 works normally, the first power signal is a high level voltage signal; and when the first power supply does not work, the first power signal is a low level voltage signal. If the second power supply 30 works normally, the second power signal is a high level voltage signal; if not, the second power signal is a low level voltage signal. When the selection switch 16 is turned on to select the first power supply 20, the selection signal is a high level voltage signal, when the selection switch 16 is turned off to select the second power supply 30, the selection signal is a low level voltage signal.

The control circuit 18 includes a NOT gate U1, an OR gate U2 having two input terminals C1~C2 and an output terminal C3, and an AND gate U3 having two input terminals A1~A2 and an output terminal Q. The input terminal C1 of the OR gate U2 is connected to the output terminal C of the selection switch 16, the other input terminal C2 of the OR gate U2 is connected to the output terminal B of the second sensor 14 via the NOT gate U1, and the output terminal C3 of the OR gate U2 and the output terminal A of the first sensor 12 are connected to the input terminals A1~A2 of the AND gate U3 respectively. The output terminal Q of the AND gate U3 acts as the output terminal of the control circuit 18 and is connected to the relay switch 100.

The relay switch 100 has a first channel 110, a second channel 120, and a relay 130. The first channel 110 has a normally open throw 1 NO connected to a live wire L of the first power supply 20, a normally closed throw 1 NC connected to a live wire L of the second power supply 30, and a pole connected to the electronic device 40. The second channel 120 has a normally open throw 2NO connected to a naught wire N of the first power supply 20, a normally closed throw 2NC connected to a naught wire N of the second power supply 30, and a pole connected to the electronic device 40. The relay 130 is connected to the output terminal Q of the AND gate U3 for controlling the first and the second channels 110 and 120 according to the control signal generated from the control circuit 18.

Therefore, when the relay 130 receives a low level voltage signal, the second power supply 30 is coupled to the electronic device 40 via the relay switch 100, and when the relay 130 receives a high level voltage signal, the first power supply 20 is coupled to the electronic device 40 via the relay switch 100.

When the first power supply 20 and the second power supply 30 both work normally, the first and the second power signals are high level voltage signals. Therefore, if the selection switch 16 is turned on, the control signal generated from the output terminal Q of the AND gate U3 is a high level voltage signal, the first power supply 20 is coupled to the electronic device 40. If the selection switch is turned off, the control signal is a low level voltage signal to control the relay switch 100 to couple the second power supply 30 to the electronic device 40.

When the first power supply 20 works normally and the second power supply 30 is turned off, the first power signal is a high level voltage signal and the second power signal is a low level voltage signal. Therefore, the control signal generated from the output terminal Q of the AND gate U3 is a high level voltage signal no matter if the selection switch 16 is turned on or off. The first power supply 20 is coupled to the electronic device 40 via the relay switch 100.

When the first power supply 20 is turned off and the second power supply 30 works normally, the first power signal is a low level voltage signal and the second power signal is a high level voltage signal. Therefore, the control signal generated from the output terminal Q of the AND gate U3 is a low level voltage signal no matter if the selection switch 16 is turned on or off. The second power supply 30 is coupled to the electronic device 40 via the relay switch 100.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A dual power supply system comprising:
   a first sensor having a detecting terminal connected to a first power supply and an output terminal to send a first power signal;
   a second sensor having a detecting terminal connected to a second power supply and an output terminal to send a second power signal;
   a selection switch having an output terminal to send a selection signal;
   a control circuit having three input terminals connected to the output terminals of the first sensor, the second sensor, and the selection switch respectively, and an output terminal to send a control signal according to the first power signal, the second power signal, and the selection signal; and
   a relay switch having two throws connected to the first and the second power supplies respectively, a pole connected to an electronic device, and a control terminal connected to the output terminal of the control circuit for selectively coupling the pole to one of the throws thereby coupling the first or second power supply to the electronic device according to the control signal;
   wherein upon a condition that one of the first and second power supplies does not work, the control signal is controlled by the first and second power signals and causes the relay switch to couple the other one of the first and second power supplies to the electronic device;
   upon a condition that the first and second power supplies both work normally, the control signal is controlled by the selection signal and causes the relay switch to couple a selected power supply of the first and second power supplies to the electronic device;
   the control circuit includes a NOT gate, an OR gate, and an AND gate, two input terminals of the OR gate are connected to the output terminal the second sensor via the NOT gate and the output terminal of the selection switch respectively, the output terminal of the OR gate and the output terminal of the first sensor are connected to two input terminals of the AND gate respectively, an output terminal of the AND gate acting as the output terminal of the control circuit is connected to the relay switch.

2. The dual power supply system as claimed in claim 1, wherein the relay switch has a first channel having a normally open throw connected to a live wire of the first power supply and a normally closed throw connected to a live wire of the second power supply, a second channel having a normally open throw connected to a naught wire of the first power supply and a normally closed throw connected to a naught wire of the second power supply, and a relay to control the first and the second channels according to the control signal.

3. The dual power supply system as claimed in claim 1, wherein each of the first and second sensors is a voltage sensor.

4. A dual power supply system comprising:
   a main power supply end a backup power supply;
   a control circuit comprising a first input terminal connected to the main power supply via a first sensor and configured to receive a status signal of the main power supply from the first sensor, a second input terminal connected to the backup power supply via a second sensor and configured to receive a status signal of the backup power supply from the second sensor, a third input terminal connected to a selection switch for receiving a selection signal from the selection switch, and an output terminal to output a control signal, the control signal being achieved by arithmetic performed on the statue signals of the main and backup power supplies and the selection signal; and
   a relay switch configured to receive the control signal from the output terminal of the control circuit, and select the main power supply or the backup power supply to supply power to an electronic device according to the control signal;
   wherein upon a condition that one of the main and backup power supplies does not work, the control signal is controlled by the status signals of the main and backup power supplies and causes the relay switch to couple the other one of the main and backup power supplies to the electronic device;
   upon a condition that the main and backup power supplies both work normally, the control signal is controlled by the selection signal and causes the relay switch to couple a selected power supply of the main and backup power supplies to the electronic device;
   the control circuit further comprises a NOT gate, an OR gate, and an AND gate, the first input terminal is connected to one of two inputs of the AND gate, the second input terminal is connected to one of two inputs of the OR gate via the NOT gate, the third input terminal is connected to the other one of the two inputs of the OR gate, an output of the OR gate is connected to the other one of the two inputs of the AND gate, an output of the AND gate acts as the output terminal of the control circuit.

5. The dual power supply system as claimed in claim 4, wherein the relay switch has a first channel having a normally open throw connected to a live wire of the first power supply and a normally closed throw connected to a live wire of the second power supply, a second channel having a normally open throw connected to a naught wire of the first power supply and a normally closed throw connected to a naught wire of the second power supply, and a relay coupled to the output terminal of the control circuit and configured to control the first and the second channels according to the control signal.

6. The dual power supply system as claimed in claim 4, wherein each of the first and second sensors is a voltage sensor.

7. A dual power supply system comprising:
   a first power supply and a second power supply;
   a control circuit comprising a plurality of logical gates, a first input terminal connected to the first power supply via a first sensor and configured to receive a status signal of the first power supply from the first sensor, a second input terminal connected to the second power supply via a second sensor and configured to receive a status signal of the second power supply from the second sensor, a third input terminal connected to a selection switch for receiving a selection signal therefrom, and an output terminal configured to output a control signal achieved by arithmetic performed on the status signals of the power supplies and the selection signal by the gates; and a relay switch having two throws connected to the first and the second power supplies respectively, a pole connected to an electronic device, and a control terminal connected to the output terminal of the control circuit for selectively coupling the pole to one of the throws thereby coupling the first or second power supply to the electronic device according to the control signal;

wherein upon a condition that one of the first and second power supplies does not work, the control signal is controlled by the status signals of the first and the second power supplies and causes the relay switch to couple the other one of the first and second power supplies to the electronic device;

upon a condition that the first and second power supplies both work normally, the control signal is controlled by the selection signal and causes the relay switch to couple a selected power supply of the first and second power supplies to the electronic device;

the gates comprises a NOT gate, an OR gate, and an AND gate, the first input terminal is connected to one of two inputs of the AND gate, the second input terminal is connected to one of two inputs of the OR gate via the NOT gate, the third input terminal is connected to the other one of the two inputs of the OR gate, an output of the OR gate is connected to the other one of the two inputs of the AND gate, an output of the AND gate acts as the output terminal of the control circuit.

8. The dual power supply system as claimed in claim 7, wherein the relay switch has a first channel having a normally open throw connected to a live wire of the first power supply and a normally closed throw connected to a live wire of the second power supply, a second channel having a normally open throw connected to a naught wire of the first power supply and a normally closed throw connected to a naught wire of the second power supply, and a relay coupled to the output terminal of the control circuit and configured to control the first and the second channels according to the control signal.

9. The dual power supply system as claimed in claim 7, wherein each of the first and second sensors is a voltage sensor.

* * * * *